Figure 1:
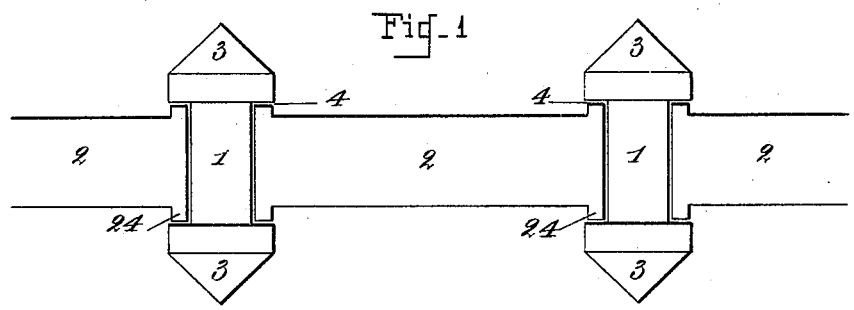

No. 838,389. PATENTED DEC. 11, 1906.
H. DAYDÉ & A. PILLÉ.
METHOD OF CONSTRUCTING MASONRY STRUCTURES.
APPLICATION FILED MAY 6, 1904.

5 SHEETS—SHEET 1.

WITNESSES
Wm. Kuehne
Edmund Hanrock

INVENTORS
Henri Daydé
Auguste Pillé
BY Richardson
ATTORNEYS

THE NORRIS PETERS CO., WASHINGTON, D. C.

No. 838,389. PATENTED DEC. 11, 1906.
H. DAYDÉ & A. PILLÉ.
METHOD OF CONSTRUCTING MASONRY STRUCTURES.
APPLICATION FILED MAY 6, 1904.
5 SHEETS—SHEET 2.
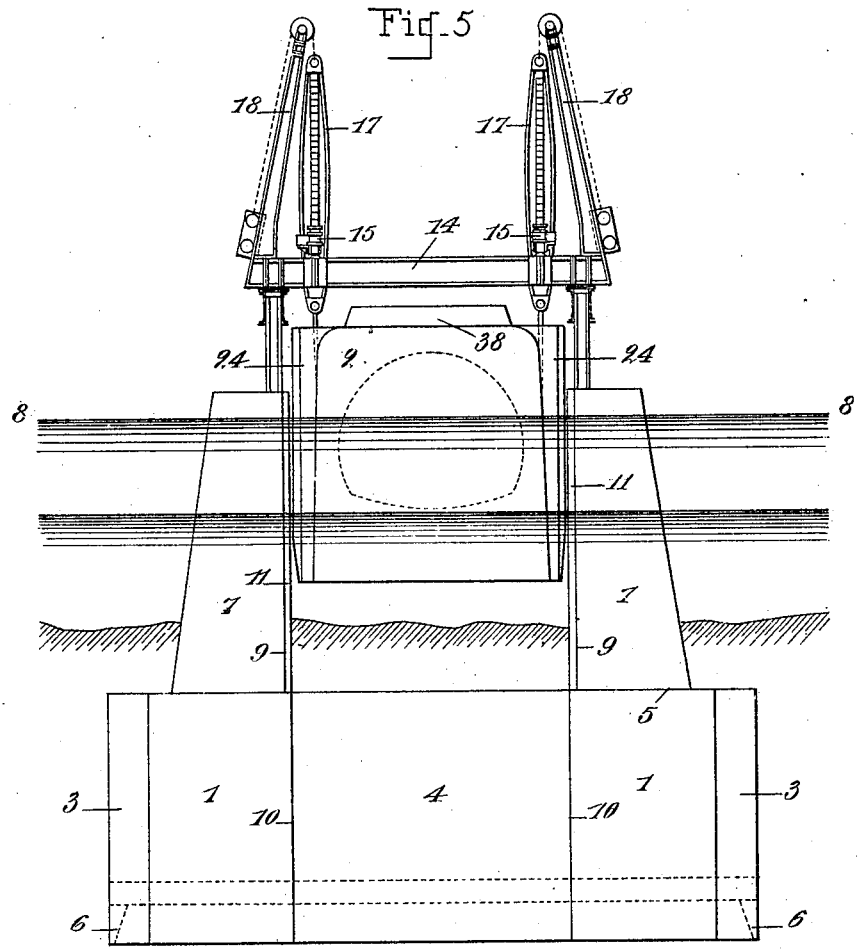
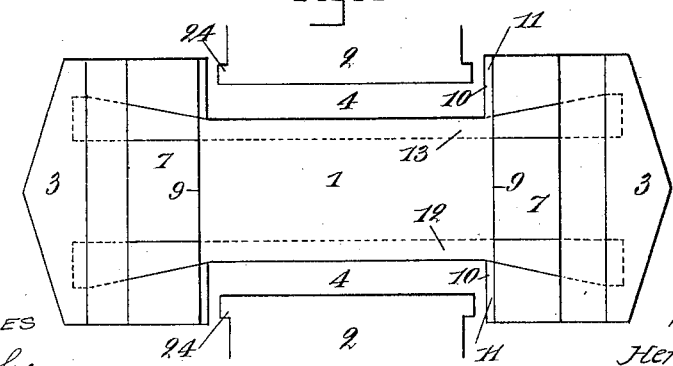
WITNESSES
INVENTORS
Henri Daydé
Auguste Pillé
BY Richardson
ATTORNEYS No. 838,389. PATENTED DEC. 11, 1906.
H. DAYDÉ & A. PILLÉ.
METHOD OF CONSTRUCTING MASONRY STRUCTURES.
APPLICATION FILED MAY 6, 1904.

5 SHEETS—SHEET 3.

WITNESSES
W. M. Kuehne
Edmund Hancock

INVENTORS
Henri Daydé
Auguste Pillé
BY Richard
ATTORNEYS

No. 838,389. PATENTED DEC. 11, 1906.
H. DAYDÉ & A. PILLÉ.
METHOD OF CONSTRUCTING MASONRY STRUCTURES.
APPLICATION FILED MAY 6, 1904.
6 SHEETS—SHEET 4.
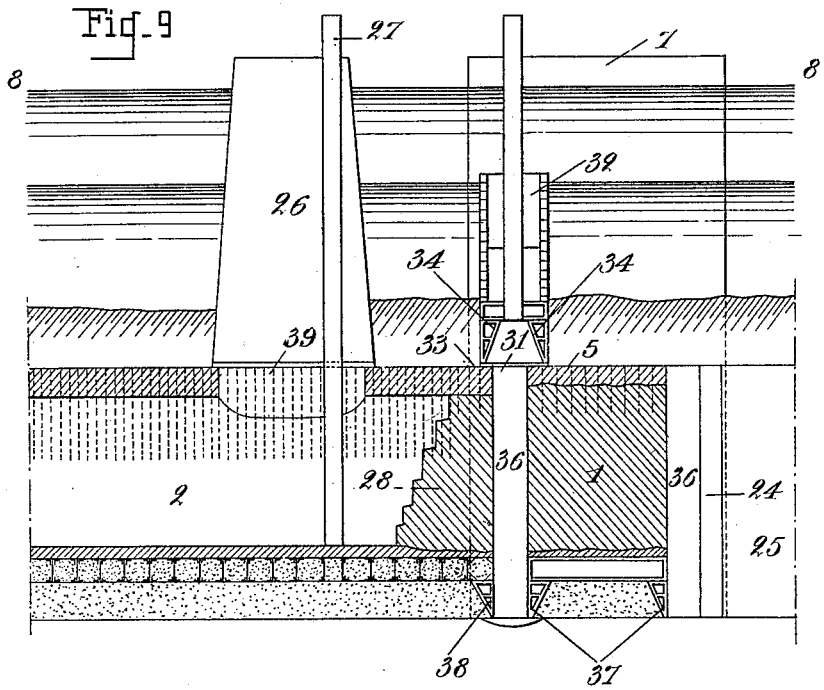
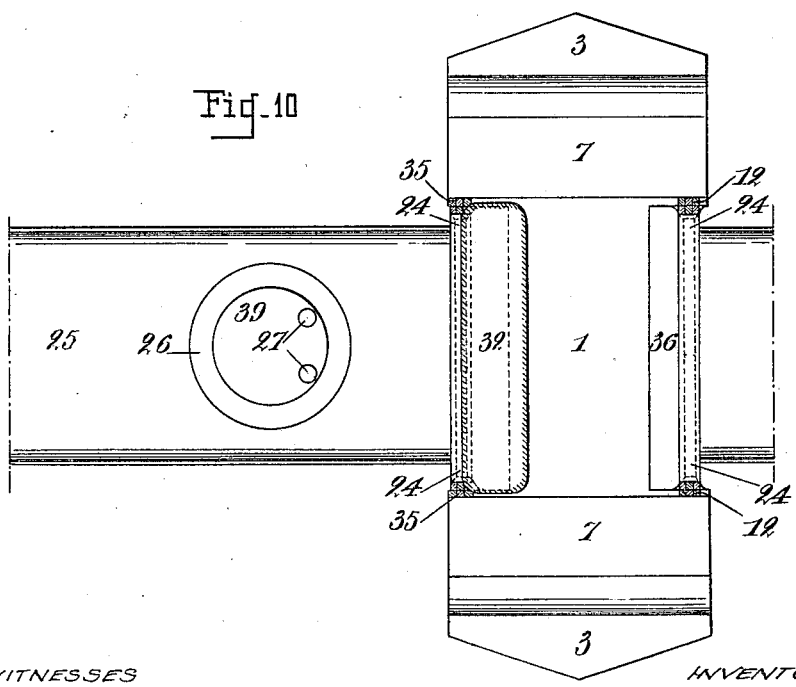
WITNESSES
INVENTORS
Henri Daydé
Auguste Pillé
BY
ATTORNEYS No. 838,389. PATENTED DEC. 11, 1906.
H. DAYDÉ & A. PILLÉ.
METHOD OF CONSTRUCTING MASONRY STRUCTURES.
APPLICATION FILED MAY 6, 1904.
5 SHEETS—SHEET 5.
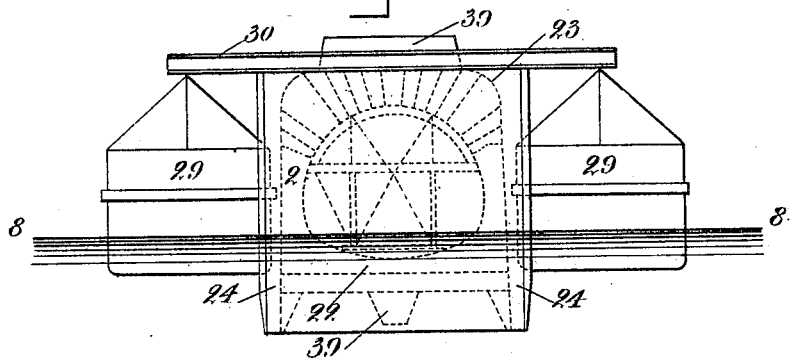
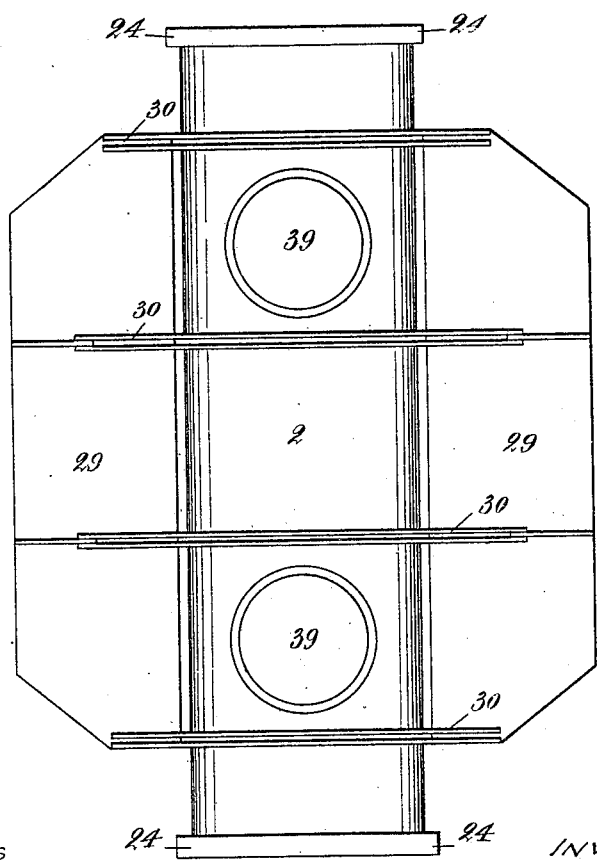
WITNESSES
Wm. Kuehne
Edmund Hancock
INVENTORS
Henri Daydé
Auguste Pillé
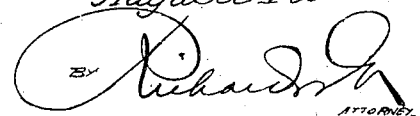
ATTORNEY
THE NORRIS PETERS CO., WASHINGTON, D. C.

UNITED STATES PATENT OFFICE.

HENRI DAYDÉ AND AUGUSTE PILLÉ, OF PARIS, FRANCE.

METHOD OF CONSTRUCTING MASONRY STRUCTURES.

No. 838,389.   Specification of Letters Patent.   Patented Dec. 11, 1906.

Application filed May 6, 1904. Serial No. 206,707.

*To all whom it may concern:*

Be it known that we, HENRI DAYDÉ and AUGUSTE PILLÉ, citizens of the Republic of France, and residents of Paris, France, have invented certain new and useful Improvements in Methods of Constructing Masonry Structures in Rivers, more particularly applicable to subfluvial tunnels, (for which we have filed in France a patent June 18, 1903, to which corresponds a patent of addition of March 24, 1904,) of which the following is a specification.

The method of construction forming the subject of the present invention has for its object the construction of masonry structures in rapidly-flowing rivers especially, and also of subfluvial tunnels through readily-underminable permeable soil; and it permits to obviate difficulties which cannot be satisfactorily overcome by the means of construction hitherto in use. The said method consists in combining together guide piers and junction or shaft pieces or sections in alternating series, intimately binding the same together by means of a system of rabbets formed in these piers and assembling the sections and the piers so as to constitute a solid body, the manner of combining said piers with the junction or shaft sections permitting of the construction of continuous or non-continuous masonry structures being carried on at will.

For the practical application of the constructing tunnels in sections or sectional parts, particularly in the case of rapid-flowing rivers, it is absolutely necessary, from the point of view of stability of the entire structure to insure perfect stability and immobility of the points of junction of each section. The improved method allows of this result being attained, the guide-piers insuring the required stability.

According to the present invention a perfectly solid structure is provided by the guide-piers, which have the maximum resistance to shifting by reason of their special form and the strengthening of the caissons by metal roofs, whereby any strain of shifting is transmitted from one rabbet to the opposite rabbet, and so to the entire body of the pier, thus bringing into play the resistance to shifting of the entire base, and consequently the total weight of the monolith.

Figure 2:
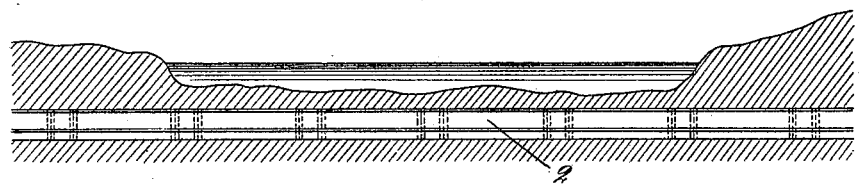
Figure 3:
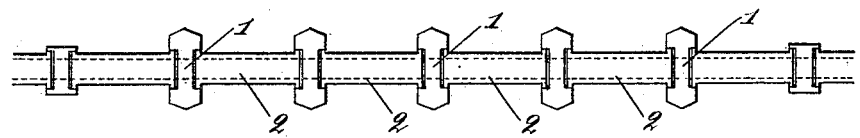
Figure 4:
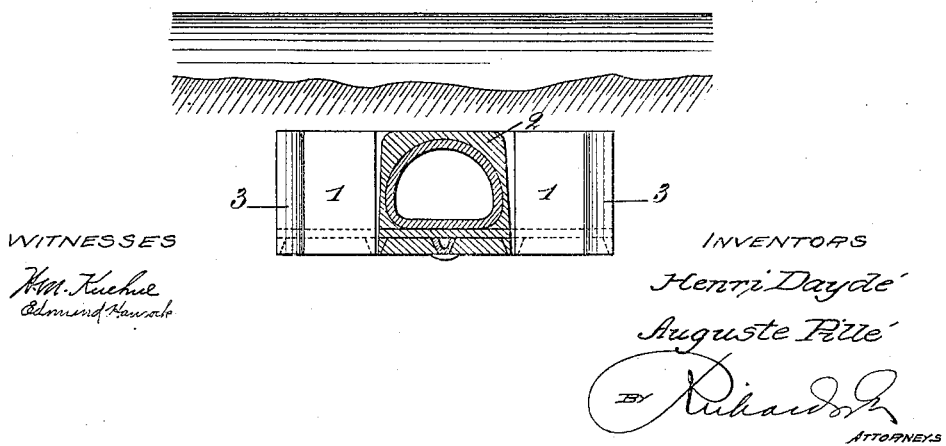
Figure 7:
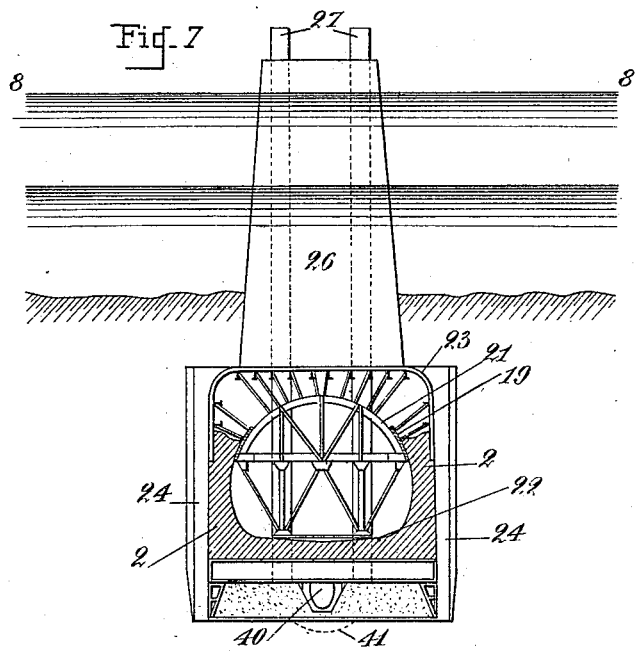
Figure 8:
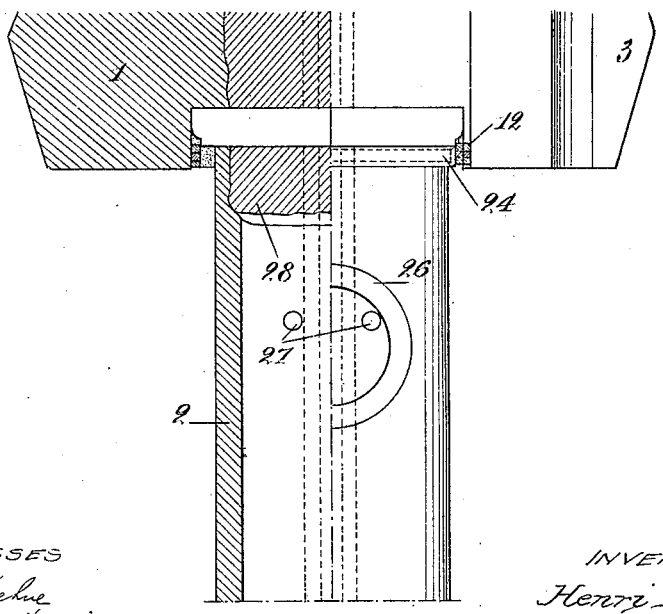

Figures 1 and 3 are plan views. Fig. 2 is a sectional view transverse to the stream and longitudinally of the tunnel. Figs. 4 and 7 are transverse sections of the tunnel in position. Fig. 5 is an elevation of the guide-pier and the end of a tunnel-section, showing also appliances for lowering the section. Fig. 6 is a plan view of the same. Fig. 8 is a plan view of part of a tunnel-section and its guide-pier, partly in horizontal section. Fig. 9 is a vertical longitudinal section showing features of the procedure in construction. Fig. 10 is a plan view, partly in section, illustrating details. Fig. 11 is an elevation, and Fig. 12 a plan.

Subfluvial tunnels constructed according to the improved method are therefore constituted, as shown in Figures 1, 2, and 3, by means of guide or abutment piers or blocks 1 and tunnel-sections 2, suitably coupled together by special joints, and the following description will indicate the sequence of steps or acts performed in the practice of the said improved method.

Piers 1, Figs. 4, 5, and 6, the dimensions and spacing of which are determined for each case by consideration of stability, navigation, &c., are sunk in the direction of the current by the well-known pneumatic system. These guide-piers may or may not be furnished with starlings 3, disposed in the direction of the current, as is usual with ordinary piers. The position of these guide-piers need not be exact, and variations in the setting thereof are of no consequence. In any case these piers constitute fixed points for assembling the sections of the tunnel. It is sufficient to provide the said piers with an appropriately large base and set their foundation at the necessary depth. Rabbets 4, formed by their projecting walls, will hold the masonry lengths or tunnel-sections 2 placed across the current.

The masonry is built up in the open air under shelter of protector-plates surmounting the working chamber in proportion with the advance of the work and according to the depth above the platform of the working chamber. The height of the masonry is limited at a suitable level, determined by the dimensions of the tunnel, by means of a second platform 5, Fig. 9.

In the middle of each face of the piers through which the tunnel is to pass a recess is formed in the entire height of the pier or structure from the cutter 6, Fig. 5, of the working chamber to the platform 5, which is surmounted by rigid coffer-dams 7, the top of which are above the level 8 8 of the water.

These coffer-dams have their inner faces 9 set off from the faces 10 of the recesses, so as to leave a space 11 capable of receiving planks of wood 12, Fig. 8, to serve to guide the shafts while being lowered. These coffer-dams are of sufficiently strong construction to resist the pressure of the current on the shafts then being lowered and moored in position. To this end they are formed of removable and easily-transportable panels or plates and are bolted together and calked with india-rubber between the adjacent or abutting faces.

The placing of the coffer-dams into position is easily effected either by floating the panels to the spot or by lowering the dams in their entirety by means of floating-sheers.

The platform 5 is strengthened by liners or stiffeners 13, Fig. 6, forming stays or tie-bars and connecting the two heads of the piers 1 in such a way that a tendency to shifting of one of the coffer-dams 7 is met by the entire block or pier, said stays or tie-bars traversing the apertures of the base of the coffer-dams.

At the upper part of the coffer-dams of the guide-piers are arranged girders 14, Fig. 5, serving as supports for powerful lifting-jacks 15, the purpose of which is to carry and lower the tunnel-sections 2 into position, so as to insure their proper grounding or bedding whatever the inequalities of the bed. The uprights 17 of these jacks, the weight of which is comparatively heavy, are suspended from counterpoised beams, jackstays, or arms 18, so as to render their operation easy and rapid.

Between the guide-piers established as above specified transverse tunnel-sections are established in the following manner. The masonry of each such section of tunnel, Figs. 7 and 8, is built in the open under the shelter of protector plates or covers capping the working chamber, and the crown 19 of each tunnel-section 2 is supported by metal centerings 21, bearing on the floor 22. A roofing 23 separates the masonry from the water. The ends of each tunnel-section are provided with heads 24 extending the entire height of the said piece and constituting an enlargement or tenon to engage the rabbets 4 of the guide-piers 1 while leaving a slight play at each side. The thickness of these heads in the direction of the length of the section is determined only after the sinking or bedding of the guide-piers, thereby permitting of the heads being formed in accordance with the displacement or inclinations which may occur in the sinking of the guide-piers. Furthermore, it is on account of these eventualities that the walls of the tunnel-sections have a certain amount of batter, so as not to impede the sinking thereof and to allow them, if necessary, to be lowered in an angular or oblique position. The upper part 25 of the section is surmounted by temporary or removable coffer-dams 26, serving as entrance and exit for workmen and materials. Pipes 27 for the supply of compressed air are disposed within these coffer-dams, which remain in place until the connection of the two consecutive tunnel-sections has been effected, as will be described hereinafter.

To close each end of a section of tunnel while it is being put in place, either a water-tight metallic cover can be used, which when the connection of two sections with each other and with the guide-piers has been accomplished can be removed, or the section can be closed by masonry, as shown at 28, Figs. 8 and 9. This latter system is the most advantageous from an economical point, and, furthermore, assures more readily a good union of the several sections when the junctions are effected. If the depth of the water permit, the masonry-work of the tunnel-section can be entirely finished before it is placed in position. If not, the finishing must be done after the grounding. In mooring and adjusting in position for grounding a tunnel-section 2 is lightened by means of floats 29, Figs. 11 and 12, upon which it rests on girders 30 and is so towed into position to engage in the recesses of the guide-piers, a suitable moment being chosen if working in a tidal river. The tunnel-section being thus brought to the desired site, it is suspended from the uprights 17 of the jacks, Fig. 5, and the grounding or bedding is proceeded with, the masonry being continued between the supports, if it is not already finished, and by ballasting when necessary to overcome the counter-pressure. If at any moment it is observed that in consequence of the shifting or undermining of the bed or from any other cause the tunnel-section tends to assume an undesirable position, it is relifted and leveled by means of the jacks; but if the grounding is properly effected the jacks are not brought into action. In fact, these jacks are utilized as auxiliary means, and by their help the grounding is thoroughly insured whatever may happen. The mooring in position being finished, the floats 29 are disengaged, and the tunnel-section is lowered to the required depth by compressed air. Then the working chamber is concreted up, and thus one portion of the tunnel is completed.

It may happen that it might be necessary to descend to a lower level than that prearranged. In such case it would be easy to build the tunnel-floor 22 higher and apply a bell-caisson over the roof or platform 23 in which more masonry can be built on the crown, so as to have the height of the tunnel in all cases as previously determined, no matter what may be the depth to which the sections may be sunk.

The tunnel-sections being sunk, as above described, between the guide-piers, the joining of the said tunnel-sections together with the guide-piers is then effected in the following manner, (see Figs. 7, 8, 9, and 10:) The vertical planks or guide-pieces 12 of the guide-piers 1 are removed. A bell-caisson 32 is brought into position between the coffer-dams 7, over the joint 31, covering it and resting on the upper platforms 5 and 33 of the caissons of the guide-piers and of the tunnel-section, as well as upon the heads 24 thereof. The cutters 34 of this bell are provided with a rabbet, allowing the building in compressed air of a very solid joint between the lower part of these cutters and the upper part of the caissons. This done, there are introduced in the spaces between the packings of the heads 24 of the tunnel-section and the walls 10 of the recess in which the tunnel-section fits wood planks 35 35, of suitable thickness, below the cutter of the bell 32. Joints sufficiently water-tight are thus formed to allow the level of water to be lowered gradually by compressed air. As fast as the level of the water is lowered the rubbish is lifted into the spaces 36, and the joints 31, now out of water, are made solid. In this way the level of the cutter 37 and 38 of the caissons of the guide-pieces and of the shaft will be reached. Then the bottom will be carefully concreted up. A chamber 36 will have thus been formed in which the iron plates, closing the ends thereof, can be taken down, and then the whole chamber is built in with masonry, forming a continuous structure of the guide-piers and tunnel-sections. The procedure is the same for the jointing of the tunnel-section on the other side of the guide-pier.

When continuity in masonry is established between two tunnel-sections and the intervening guide-pier, the sections of the tunnel are entered or penetrated by the coffer-dams 26, Fig. 9. The masonry 28 of the coffer-dam is demolished at the ends of the sections of tunnel, and the masonry of the guide-pier 1 is pierced or bored, thus opening up communication between two tunnel-sections. The tunnel is then perfected at the joint 36 and the centering removed through openings 39 left in the crown into the coffer-dam 26, those centerings only which are opposite the opening being allowed to remain to continue and close the vault until the next junction is made. The top of the masonry in the coffer-dams is now covered with iron plates and the coffer-dams removed for use with other caissons. The centerings 19 remaining in the tunnel opposite the coffer-dams 26 are removed prior to proceeding to the junction of the following elements. The construction of the tunnel such as just described being advanced by successive sections, the result thereof is the important advantage of being able to isolate these sections from each other up to completion of the work, so that should an accident occur it will be localized in a single section and the rest of the work will not suffer. Lastly, if draining-channels be required at the base of the tunnel-sections a metallic inclosure 40, Fig. 7, is constructed in the working chambers, and the concrete of these chambers is carried below the gutter at this place, as indicated by the dotted lines 41. When sinking is completed, the concrete of the inclosure is demolished, and a perfectly-sound draining-gutter is thus formed to receive the infiltration-waters, which are caused to run into a drain-well, from which they can be removed by pumps or in other suitable way.

Having thus described our invention, what we claim, and desire to secure by Letters Patent, is—

1. An improved method of constructing masonry structures in rivers, more particularly applicable to the construction of subfluvial tunnels, consisting in erecting crosswise of the current and in the axial direction of the structure, or of the tunnel, guide-piers provided with starlings and rabbets; making tunnel-sections with closed ends; successively placing such sections between rabbets of the piers; uniting the tunnel-sections within the piers; removing the end closures and boring the central part of guide-piers to make communication between consecutive tunnel-sections, substantially as described.

2. An improved method of constructing masonry structures in rivers or subfluvial tunnels, consisting in erecting crosswise of the current and in the axial direction of the tunnel, guide-piers provided with starlings, rabbets, and strengthening-stays connecting the two ends or heads of each of these piers, and transmitting any tendency to shifting exerted on any one of the rabbets to the opposite face and to the whole of the piers, making tunnel-sections with closed ends and having at their two ends projecting heads adapted to engage the rabbets in the guide-piers, constructing a masonry lining to join the sections and the piers; removing the end inclosures of the sections, and boring the central part of guide-piers to make communication between consecutive tunnel-sections, substantially as described.

3. An improved method of constructing masonry structures in rivers, or subfluvial tunnels consisting in erecting crosswise of the current and in the axial direction of the tunnel, guide-piers provided with starlings, rabbets, strengthening-stays, and guide-pieces surmounting the said piers and secured by means of girders carrying powerful jacks, making tunnel-sections with closed ends; mooring or grounding successively between the guide-pieces of two consecutive guide-piers one of the said tunnel-sections, the said section being suspended from the said jacks whereby it can be moored or grounded in a perfectly horizontal position; constructing a masonry joining the tunnel-sections and the piers, removing the end inclosures of the sections and boring the central part of guide-piers to make communication between consecutive tunnel-sections, substantially as described.

4. An improved method of constructing masonry structures in rivers, or subfluvial tunnels consisting in forming guide-piers crosswise of the current and in the axial direction of the tunnel; making tunnel-sections with closed ends; successively placing the said sections between rabbets of the piers; assembling the sections and the piers so as to constitute a solid body by surrounding the corresponding joint with a bell-caisson so as to provide on the right of the joint being dealt with a hermetic chamber which is then bricked up, removing the end closures and boring the central part of guide-piers to make communication between consecutive tunnel-sections, substantially as described.

5. An improved method of constructing masonry structures in rivers or subfluvial tunnels consisting in forming guide-piers crosswise of the current; successively mooring or grounding between these piers, tunnel-sections, closed hermetically at their ends, and provided with coffer-dams permitting access to the interior of the said tunnel-sections; assembling said sections and the piers so as to constitute a solid body; demolishing the masonry closing the ends of the said tunnel-sections, and piercing or boring the masonry of the guide-pier connecting two consecutive tunnel-sections, so as to establish the continuity of the tunnel between these latter, substantially as described.

In witness whereof we have hereunto set our hands in presence of two witnesses.

HENRI DAYDÉ.
AUGUSTE PILLÉ.

Witnesses:
HANSON C. COXE,
JULES FAYOLLET.